United States Patent
Horiike

(10) Patent No.: US 10,979,583 B2
(45) Date of Patent: Apr. 13, 2021

(54) INFORMATION PROCESSING APPARATUS EQUIPPED WITH TOUCH PANEL TYPE DISPLAY UNIT, CONTROL METHOD THEREFOR, AND STORAGE MEDIUM

(71) Applicant: CANON KABUSHIKI KAISHA, Tokyo (JP)

(72) Inventor: Yoshiteru Horiike, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/267,750

(22) Filed: Feb. 5, 2019

(65) Prior Publication Data

US 2019/0245992 A1     Aug. 8, 2019

(30) Foreign Application Priority Data

Feb. 8, 2018   (JP) .............................. JP2018-021132

(51) Int. Cl.
  *H04N 1/00*     (2006.01)
  *G06F 3/14*     (2006.01)
(52) U.S. Cl.
  CPC ..... *H04N 1/00424* (2013.01); *H04N 1/00474* (2013.01)
(58) Field of Classification Search
  None
  See application file for complete search history.

(56) References Cited

U.S. PATENT DOCUMENTS

| | | | | |
|---|---|---|---|---|
| 2002/0180802 A1* | 12/2002 | Ogawa | ................. | G01C 21/367 715/809 |
| 2009/0315848 A1* | 12/2009 | Ku | ........................ | G06F 3/0416 345/173 |
| 2011/0018827 A1* | 1/2011 | Wang | .................... | G06F 3/0482 345/173 |
| 2011/0320984 A1* | 12/2011 | Irani | ..................... | G06F 3/0482 715/841 |
| 2012/0050192 A1* | 3/2012 | Kobayashi | ............ | G06F 3/0488 345/173 |
| 2012/0249439 A1* | 10/2012 | Kawate | ............... | H04M 1/2477 345/173 |

(Continued)

OTHER PUBLICATIONS

"How to add a program to startup." http://faq3.dospara.co.jp/faq/show/4468?site_domain=default. Jun. 16, 2016: 1-7. Partial English Translation provided.

*Primary Examiner* — Beniyam Menberu
(74) *Attorney, Agent, or Firm* — Rossi, Kimms & McDowell LLP

(57) ABSTRACT

An information processing apparatus that makes it easy to recognize which operating button corresponds to a displayed context menu. The context menu is for giving an instruction to execute a function corresponding to an operating button displayed on a display unit and is displayed when a predetermined operation on the operating button by a user is detected. The context menu is displayed at a predetermined display position set in advance with respect to a detected position at which the predetermined operation is detected on the display unit. Based on the detected position, the predetermined display position is switched to a position at which a characteristic part which represents a function corresponding to the operating button is not hidden by the context menu.

14 Claims, 16 Drawing Sheets

(56) References Cited

U.S. PATENT DOCUMENTS

| | | | | |
|---|---|---|---|---|
| 2012/0313875 | A1* | 12/2012 | Ohnishi | G06F 3/0421 345/173 |
| 2013/0019182 | A1* | 1/2013 | Gil | G06F 3/0482 715/738 |
| 2014/0223367 | A1* | 8/2014 | Hatada | G06F 3/04842 715/810 |
| 2015/0007106 | A1* | 1/2015 | Ishii | G06F 3/0482 715/808 |
| 2015/0324070 | A1* | 11/2015 | Kim | G06F 1/1694 715/825 |
| 2016/0026327 | A1* | 1/2016 | Park | G06F 3/04883 345/173 |
| 2016/0092050 | A1* | 3/2016 | Dos Santos | G06F 3/0488 715/822 |
| 2016/0291813 | A1* | 10/2016 | Lee | G06F 3/04817 |
| 2017/0347073 | A1* | 11/2017 | Shimizu | G06F 3/011 |
| 2018/0091667 | A1* | 3/2018 | Yamasaki | H04N 1/00381 |
| 2018/0183954 | A1* | 6/2018 | Endo | H04N 1/00411 |

* cited by examiner

FIG. 3A

301
- OPEN
- MOVE BUTTON

FIG. 3B

302
- CALL
- CHANGE NAME OF SHARED BUTTON
- DELETE SHARED BUTTON
- MOVE BUTTON

FIG. 3C

303
- CALL
- CHANGE NAME OF MY BUTTON
- DELETE MY BUTTON
- MOVE BUTTON

FIG. 3D

304
- MOVE BUTTON
- EDIT BUTTON
- SET BUTTON SIZE AND NUMBER OF BUTTONS
- MAKE SETTINGS ON BACKGROUND
- MAKE SETTINGS ON HOME SCREEN MANAGEMENT
- MAKE SETTINGS ON SHORTCUT BUTTON FOR FUNCTION

FIG. 3E

305
- CALL
- REGISTER AS HOME SCREEN
- DELETE

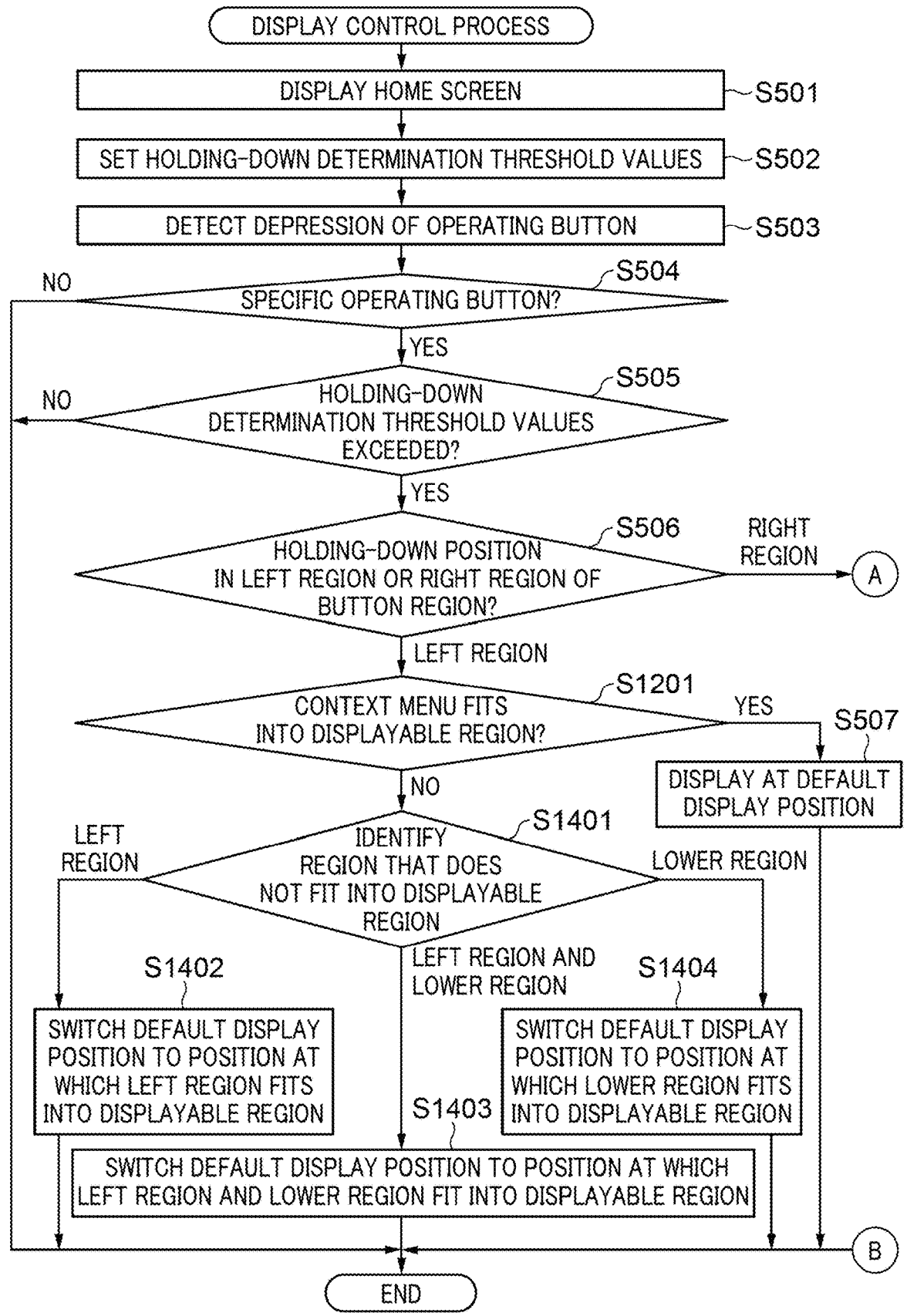

INFORMATION PROCESSING APPARATUS EQUIPPED WITH TOUCH PANEL TYPE DISPLAY UNIT, CONTROL METHOD THEREFOR, AND STORAGE MEDIUM

BACKGROUND OF THE INVENTION

Field of the Invention

The present invention relates to an information processing apparatus, a control method therefor, and a storage medium.

Description of the Related Art

An information processing apparatus equipped with a touch panel type display unit is known. In this information processing apparatus, a plurality of operating buttons corresponding to respective functions is displayed on a display unit. In this information processing apparatus, when a predetermined operation, for example, a holding-down operation is performed on a displayed operating button, a context menu for the operating button is displayed on the display unit (see, for example, http://faq3.dospara.co.jp/faq/show/4468?site_domain=default "How to add a program to startup"). The context menu includes a list of operations for a function corresponding to the held-down operating button. A user can select a desired operation from the context menu and instruct the information processing apparatus to perform processing. The context menu is displayed on the held-down operating button, and more specifically, at a default position on the lower left or lower right of a position held down on the operating button (hereafter referred to as a "held-down position"). This enables the user to easily recognize which operating button corresponds to a context menu displayed on the display unit.

However, in the conventional information processing apparatus, unless a user holds down an appropriate position on the operating button, the held-down operating button is hidden by a context menu. This presents a problem that the user cannot easily recognize which operating button corresponds to a displayed context menu.

SUMMARY OF THE INVENTION

The present invention provides an information processing apparatus and a control method therefor, which makes it easy to recognize which operating button corresponds to a displayed context menu, as well as a storage medium.

Accordingly, the present invention provides an information processing apparatus that has a display unit and displays an instruction setting menu for giving an instruction to execute a function corresponding to an operating object displayed on the display unit when a predetermined operation on the operating object by a user is detected, comprising a display control unit configured to provide control such that the instruction setting menu is displayed at a predetermined display position set in advance with respect to a detected position at which the predetermined operation is detected on the display unit, wherein based on the detected position, the display control unit switches the predetermined display position to a position at which a characteristic part that represents a function corresponding to the operating object is not hidden by the instruction setting menu.

According to the present invention, which operating button corresponds to a displayed context menu is easily recognized.

Further features of the present invention will become apparent from the following description of exemplary embodiments (with reference to the attached drawings).

BRIEF DESCRIPTION OF THE DRAWINGS

FIGS. 3A to 3E are views showing examples of context menus which are displayed on the display in FIG. 1.

FIGS. 14A and 14B are flowcharts showing the procedure of a fourth variation of the display control process in FIG. 5.

DESCRIPTION OF THE EMBODIMENTS

An embodiment of the present invention will now be described in detail with reference to the accompanying drawings. It should be noted that in the following description of the present embodiment, the present invention is applied to an MFP which displays context menus, but the present invention is not limited to the MFP. For example, the present invention may be applied to apparatuses such as a smartphone, a tablet terminal, and a client PC which display context menus on a display.

Figure 1:
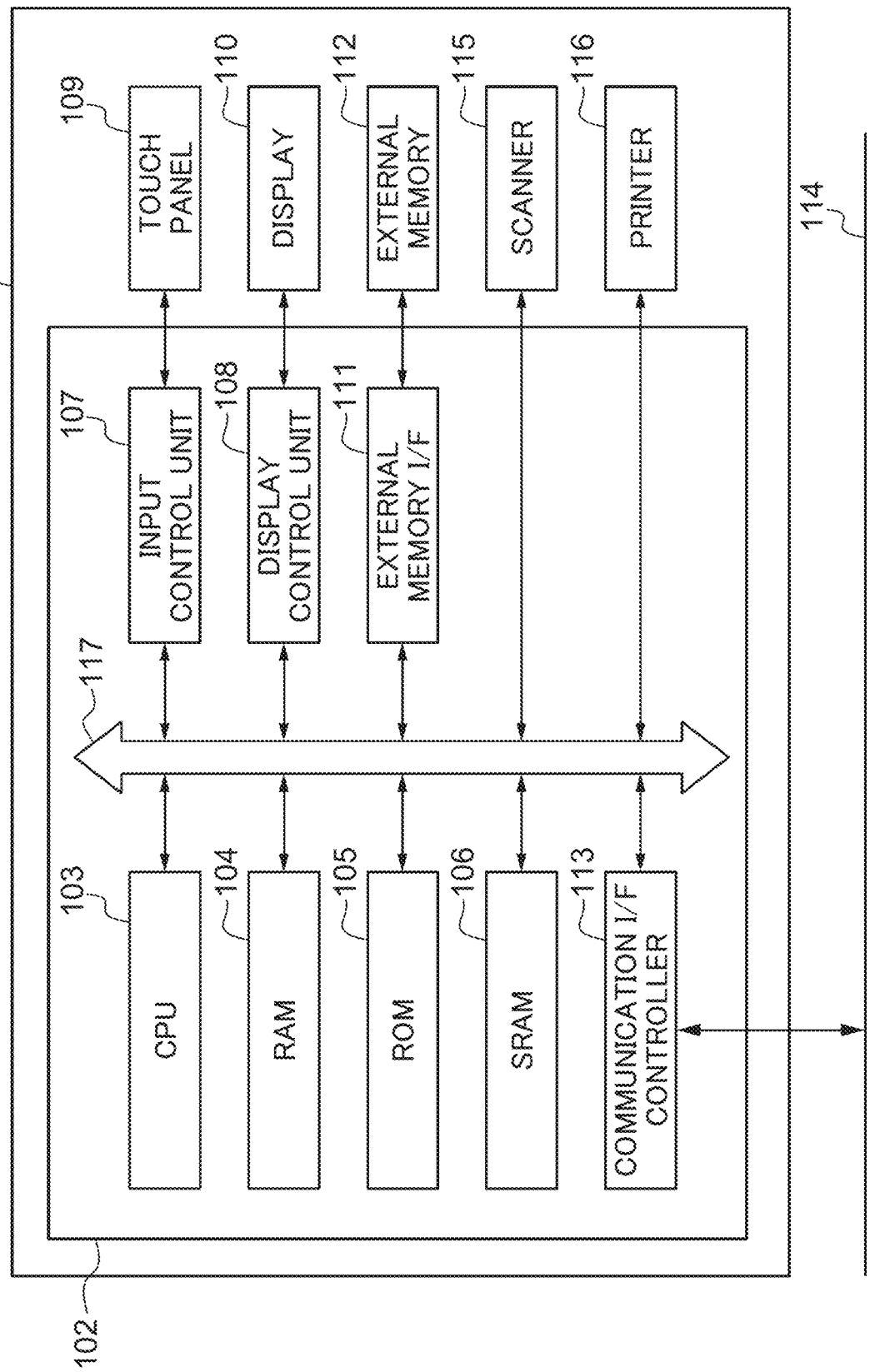
FIG. 1 is a block diagram schematically showing an arrangement of an MFP which is an information processing apparatus according to an embodiment of the present invention.

FIG. 1 is a block diagram schematically showing an arrangement of the MFP 101 which is the information processing apparatus according to the embodiment of the present invention.

Referring to FIG. 1, the MFP 101 has a control unit 102, a touch panel 109, a display 110, an external memory 112, a scanner 115, and a printer 116. The control unit 102 is connected to the touch panel 109, the display 110, the external memory 112, the scanner 115, and the printer 116. The control unit 102 also has a CPU 103, a RAM 104, a ROM 105, an SRAM 106, an input control unit 107, a display control unit 108, an external memory I/F 111, and a communication I/F controller 113. The CPU 103, the RAM 104, the ROM 105, the SRAM 106, the input control unit 107, the display control unit 108, the external memory I/F 111, and the communication I/F controller 113 are connected to one another via a system bus 117.

The control unit 102 integratedly controls the entire MFP 101. The CPU 103 controls operation of the MFP 101 by executing programs stored in the ROM 105. The RAM 104 is a volatile memory. The RAM 104 is used as a main memory and a temporary storage area such as a work area for the CPU 103. The ROM 105 is a nonvolatile memory. The ROM 105 stores programs, image data, setting data on the MFP 101, and so forth. The SRAM 106 is a nonvolatile recording medium capable of operating at high speed. When the input control unit 107 detects a gesture performed by a user, it sends a signal to that effect to the CPU 103. Examples of the gesture include "depressing", "dragging", and "releasing". "Depressing" is a gesture in which a user touches the touch panel 109 with a finger or a pen. "Dragging" is a gesture in which a user moves a finger or a pen while touching the touch panel 109 with the finger or the pen. "Releasing" is a gesture in which a user releases a finger or a pen which has touched the touch panel 109. For example, upon detecting depression on the touch panel 109 by a user, the input control unit 107 sends a signal indicating information on a position depressed by the user to the CPU 103. The display control unit 108 controls display of images on the display 110. For example, based on a display control signal received from the CPU 103, the display control unit 108 generates a display signal for displaying a GUI screen, which constitutes a GUI (graphical user interface), on the display 110. The display control unit 108 outputs the generated display control signal to the display 110.

The touch panel 109 and the display 110 act as an operating unit of the MFP 101. The touch panel 109 uses resistive technology, capacitive technology, surface acoustic wave technology, infrared technology, electromagnetic induction technology, image recognition technology, optical sensor technology, or the like to detect gestures. The touch panel 109 is attached to a top layer of a display surface of the display 110. Display coordinates on the display 110 are associated with positional coordinates on the touch panel 109. As a result, when a user depresses a certain position on a screen displayed on the display 110, the MFP 101 obtains positional information on the position on the screen from the touch panel 109.

The external memory 112 such as a hard disk, a floppy disk, a CD, a DVD, or a memory card can be attached to the external memory I/F 111. The external memory I/F 111 reads data from the external memory 112 and also writes data into the external memory 112. The communication I/F controller 113 carries out communications with external apparatuses connected to a network 114 such as a LAN, the Internet, a wired network, or a wireless network. The external apparatuses such as a PC and another MFP are connected to the network 114 such that they can communicate with the MFP 101. The scanner 115 reads originals and generates image data based on the read originals. The printer 116 performs printing on sheets based on obtained print data.

Figure 2:
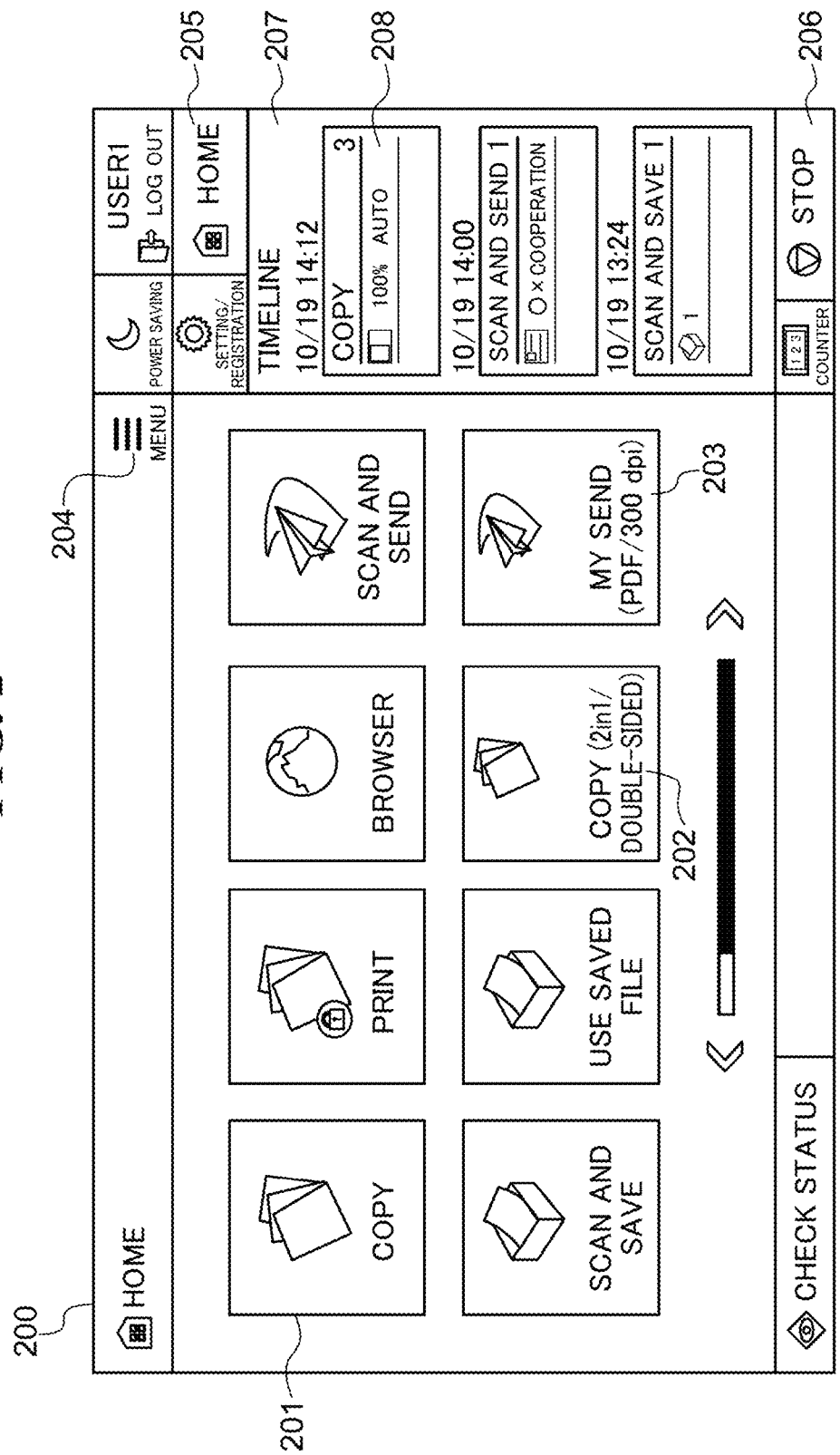
FIG. 2 is a view showing an example of a home screen for the MFP, which is displayed on a display in FIG. 1.

FIG. 2 is a view showing an example of a home screen 200 of the MFP 101 which is displayed on the display 110 in FIG. 1. The home screen 200 is a screen for prompting the user to select a function he or she will use from among a plurality of functions installed in the MFP 101.

Referring to FIG. 2, the home screen 200 has a plurality of operating buttons (operating objects). On each operating button, a button name of the operating button, an image (hereafter referred to as an "icon") representing the corresponding function, and so forth are displayed. Examples of the operating buttons include an application button, a shared custom button, a user custom button, and a setting menu button 204.

The application button is an operating button for calling a function of the MFP 101 and is, for example, a copy button 201. The copy button 201 is an operating button for calling an application with a copy function. When the copy button 201 is depressed on the home screen 200, a copy screen (not shown) is displayed on the display 110. The copy screen is a screen for setting a size, type, etc. of sheets to be used in copying.

The shared custom button is a custom button created by an administrator of the MFP 101 and available to all users of the MFP 101. The shared custom button is, for example, a copy shared button 202. When the copy shared button 202 is depressed on the home screen 200, the MFP 101 prints a scanned-in document on both sides with a layout 2in1.

The user custom button is a custom button that can be created by each user of the MFP 101 and available only to a user who created it. The user custom button is, for example, a my send button 203. The my send button 203 is displayed on the home screen 200 only when a user who had created the my send button 203 has logged in to the MFP 101. When the my send button 203 is depressed on the home screen 200, the MFP 101 converts image data, which has been obtained by scanning, into PDF data with a resolution of 300 dpi and sends the PDF data to a predetermined destination.

The setting menu button 204 is an operating button for displaying a menu in which screen settings on the MFP 101 are configured. When the setting menu button 204 is depressed on the home screen 200, a menu (not shown) for setting the size and number of operating buttons to be displayed on the display 110 and making settings on a background is displayed on the display 110.

An upper soft key area 205, a lower soft key area 206, and a timeline area 207 are provided in a right-hand part of the home screen 200. Operating buttons for displaying screens that can be called at all times are displayed in the upper soft key area 205 and the lower soft key area 206. Operating buttons such as a history button 208 for calling histories of processes carried out by respective applications are placed in the timeline area 207.

On the home screen 200, when a predetermined operation such as a holding-down operation is performed on a given operating button, a context menu corresponding to the held-down operating button is displayed. The context menu (instruction setting menu) includes a list of operations for functions corresponding to the held-down operating button. The user selects a desired operation from the context menu and instructs the MFP 101 to perform processing. In the MFP 101, context menus to be displayed vary with types of the operating buttons. When the application button such as the copy button 201 is held down, a context menu 301 in FIG. 3A is displayed on the display 110. When the shared custom button such as the copy shared button 202 is held down, a context menu 302 in FIG. 3B is displayed on the display 110. When the user custom button such as the my send button 203 is held down, a context menu 303 in FIG. 3C is displayed on the display 110. When the setting menu button 204 is held down, a context menu 304 in FIG. 3D is displayed on the display 110. When the operating button displayed in the timeline area 207 such as the history button 208 is held down, a context menu 305 in FIG. 3E is displayed on the display 110.

A context menu is displayed at a default display position, for example, on the lower left (see FIG. 4A) with respect to a held-down position (detected position) of an operating button. This enables the user to easily recognize which operating button corresponds to the displayed context menu. However, unless the user holds down an appropriate position on a held-down operating button 401, characteristic parts of the operating button 401 such as a button name and an icon are hidden by a context menu 402 as shown in FIG. 4B. This makes it harder for the user to recognize which operating button corresponds to the displayed context menu 402.

To address this problem, in the present embodiment, the default display position is switched based on a held-down position to such a position that characteristic parts of a held-down operating button are not hidden by a context menu.

Figure 5:
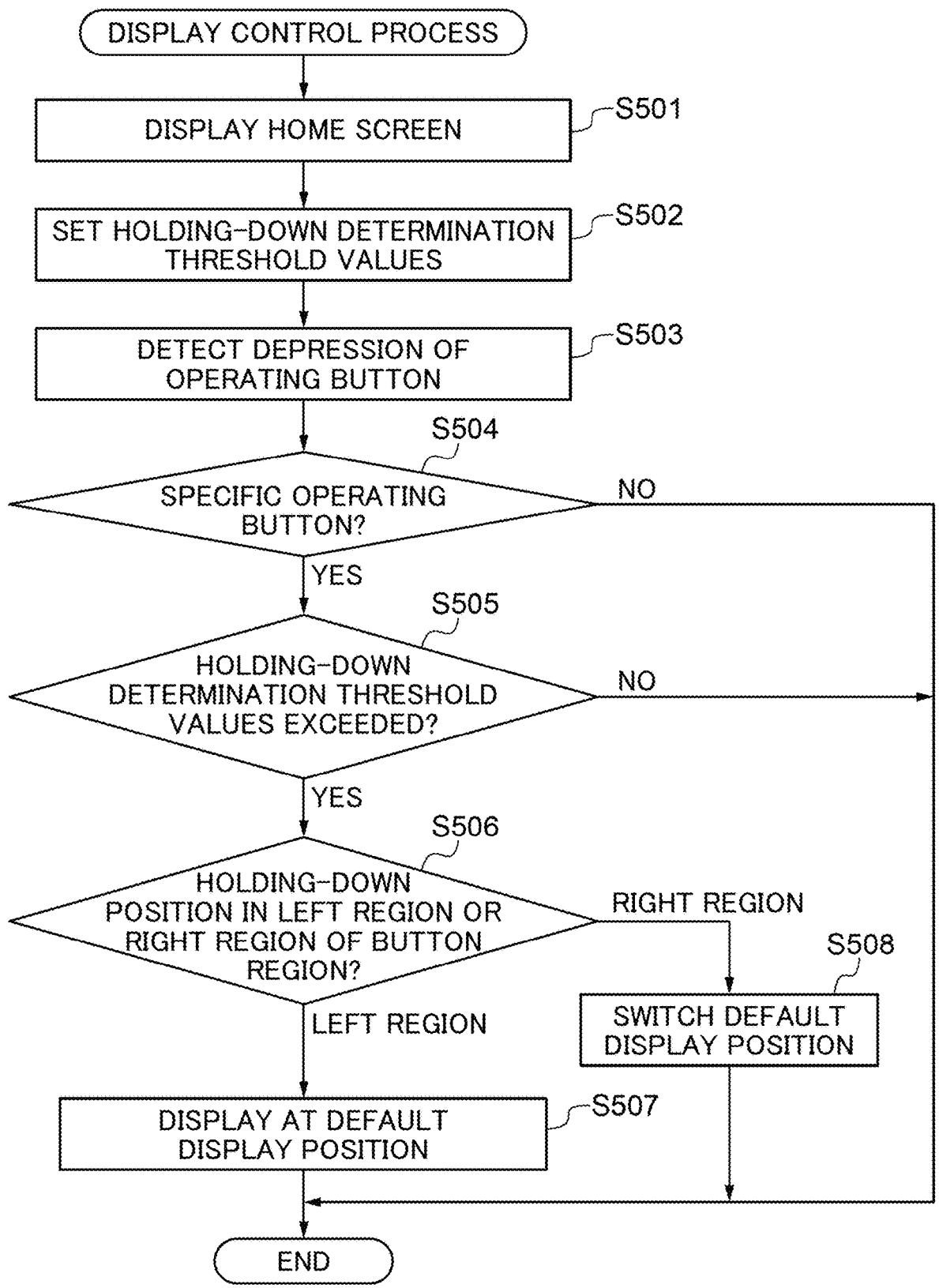
FIG. 5 is a flowchart showing the procedure of a display control process which is carried out by the MFP in FIG. 1.

FIG. 5 is a flowchart showing the procedure of a display control process which is carried out by the MFP 101 in FIG. 1. The process in FIG. 5 is implemented by the CPU 103 executing programs stored in the ROM 105 and the external memory 112. In the process in FIG. 5, it is assumed that the default display position of a context menu is set to, for example, "lower left".

Referring to FIG. 5, first, the CPU 103 displays the home screen 200 on the display 110 (step S501). Next, the CPU 103 sets holding-down determination threshold values for detecting a predetermined operation, and more specifically, a holding-down operation (step S502). When a state in which a finger has not moved a predetermined travel distance or more from a depressed position has continued for a predetermined time period, the CPU 103 determines that a holding-down operation has been performed. The CPU 103, for example, sets the predetermined travel distance to 10 (pixels) and the predetermined time period to 1 (second) as the holding-down determination threshold values.

Then, upon detecting depression of any operating button on the home screen 200 (step S503), the CPU 103 determines whether or not the depressed operating button is a specific operating button (step S504). The specific operating button is the application buttons, the shared custom button, the user custom button, the setting menu button 204, or the history button displayed in the timeline area 207.

As a result of the determination in the step S504, when the depressed operating button is the specific operating button, the CPU 103 determines whether or not the holding-down determination threshold values are exceeded (step S505).

As a result of the determination in the step S505, when the holding-down determination threshold values are not exceeded, or as a result of the determination in the step S504, when the depressed operating button is not the specific operating button, the CPU 103 ends the present process.

As a result of the determination in the step S505, when the holding-down determination threshold values are exceeded, the CPU 103 identifies a held-down position on the home screen 200. The CPU 103 divides a button region (object region) representing the operating button held down on the home screen 200 into two regions i.e. a right region and a left region. The CPU 103 determines whether the held-down position is the right region or the left region of the button region (step S506).

Figure 4A:
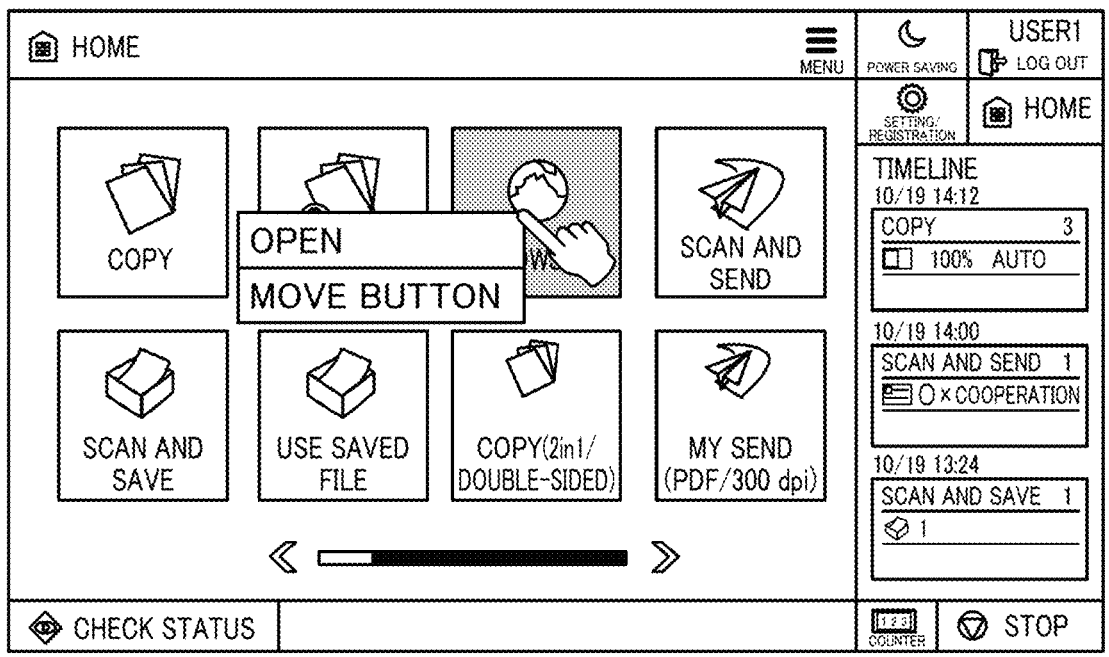
FIGS. 4A and 4B are views showing display examples of a context menu on the display in FIG. 1.
Figure 4B:
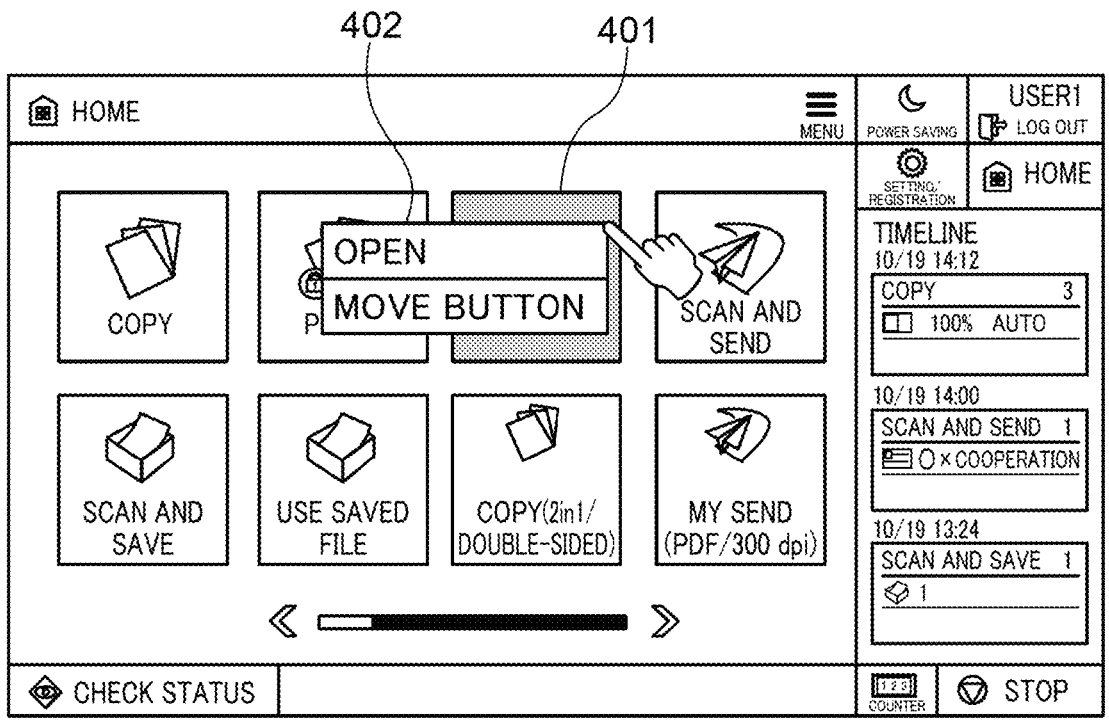

Here, in a case where a context menu is displayed on the "lower left" which is the default display position in response to holding-down of the left region of the button region, for example, all characteristic parts of the held-down operating button are not hidden by the context menu as shown in FIG. 4A. In this case, when the context menu is displayed on the "lower left" which is the default display position, it is not hard for the user to recognize a relation between the held-down operating button and the context menu. For this reason, when the held-down position is the left region, the CPU 103 carries out processes in step S507 and the subsequent steps, to be described later, without switching the default display position.

On the other hand, in a case where the context menu is displayed on the "lower left" which is the default display position in response to holding-down of the right region of the button region, for example, all characteristic parts of the held-down operating button may be hidden by the context menu as shown in FIG. 4B. In this case, when the context menu is displayed on the "lower left" which is the default display position, it is hard for the user to recognize a relation between the held-down operating button and the context menu. For this reason, when the held-down position is the right region, the CPU 103 carries out a process in step S508, to be described later.

As a result of the determination in the step S506, when the held-down position is the left region of the button region, the CPU 103 displays the context menu on the "lower left" which is the default display position with respect to the held-down position (step S507). After that, the CPU 103 ends the present process.

Figure 6:
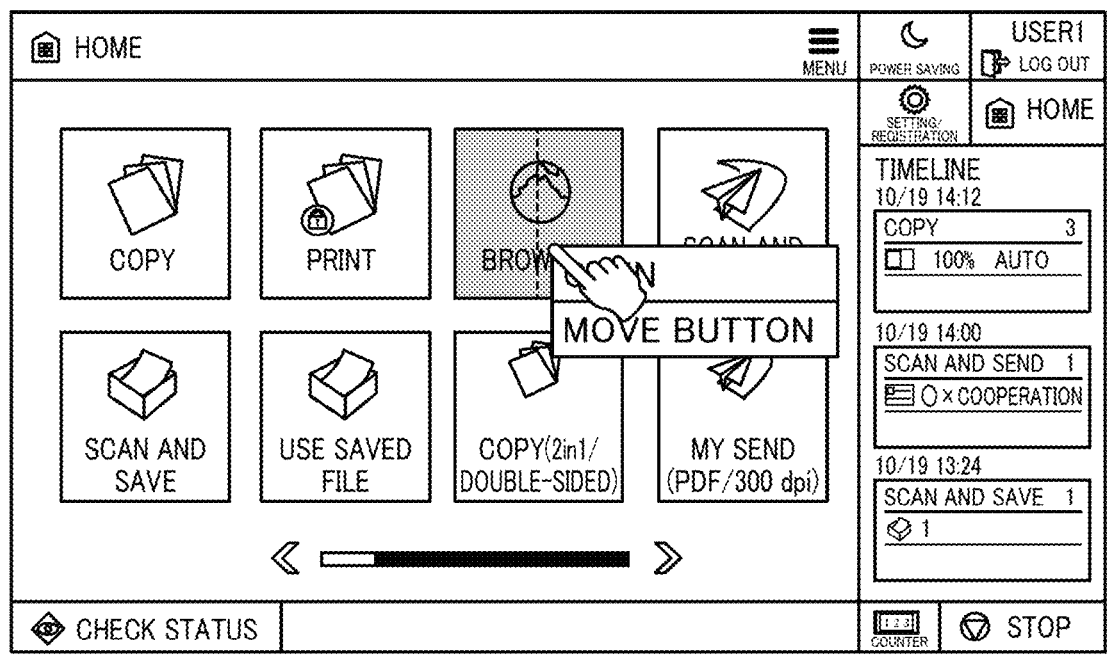
FIG. 6 is a view showing an example of a context menu displayed in the display control process in FIG. 5.

As a result of the determination in the step S506, when the held-down position is the right region of the button region, the CPU 103 switches the default display position to such a position that the characteristic parts of the held-down operating button are not hidden by the context menu (step S508). Specifically, the CPU 103 switches the default display position to the "lower right" such that the left region of the button region and the context menu do not overlap each other. After that, the CPU 103 displays the context menu on "lower right" with respect to the held-down position (see, for example, FIG. 6) and ends the present process.

According to the process in FIG. 5 described above, based on a held-down position, the default display position is switched to such a position that characteristic parts of an operating button are not hidden by a context menu. Therefore, when a context menu is displayed, characteristic parts of a held-down operating button can be shown to the user irrespective of a position held down by the user on the operating button. This enables the user to easily recognize which operating button corresponds to the displayed context menu.

Moreover, according to the process in FIG. 5 described above, when holding-down by the user is detected in the right region of the button region, the default display position is switched to "lower right" such that the left region of the button region and a context menu do not overlap each other. Therefore, when a context menu is displayed, the whole of the button region representing a held-down operating button is prevented from being hidden by the context menu dependently on a position held down by the user on the operating button.

It should be noted that the default display position of a context menu is not limited to lower left, but another position such as "upper left", "upper right", or "lower right" may be set as the default display position. For example, when "lower right" is set as the default display position, and as a result of the determination in the step S506, when the held-down position is the right region of the button region, the CPU 103 carries out the process in the step S507 without switching the default display position. On the other hand, as a result of the determination in the step S506, when the held-down position is the left region of the button region, the CPU 103 carries out the process in the step S508. Thus, even when a different position is set as the default display position, the same effects as those obtained in the embodiment described above are obtained.

Moreover, in the embodiment described above, the button region may be divided into other two regions i.e. an upper region and a lower region.

Furthermore, in the embodiment described above, the default display position of a context menu may be switched based on a held-down position in a button name region (characteristic part region) showing a button name of an operating button.

Figure 7:
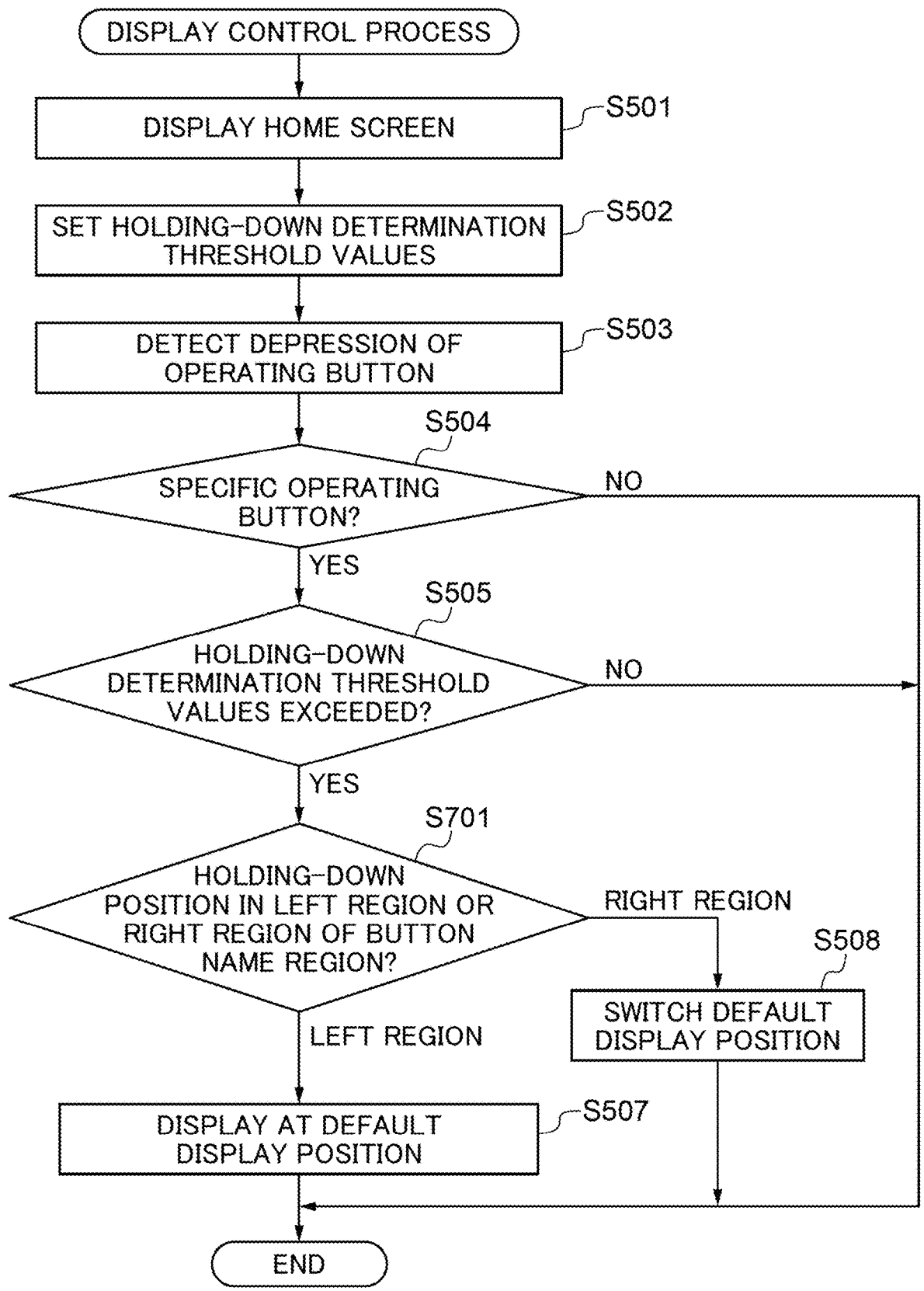
FIG. 7 is a flowchart showing the procedure of a first variation of the display control process in FIG. 5.

FIG. 7 is a flowchart showing the procedure of a first variation of the display control process in FIG. 5. The process in FIG. 7 is also implemented by the CPU 103 executing programs stored in the ROM 105 and the external memory 112. In the process in FIG. 7, it is also assumed that a default display position of a context menu is set to, for example, "lower left".

Referring to FIG. 7, the CPU 103 carries out the processes in the steps S501 to S505. Then, the CPU 103 recognizes a held-down position in a button name region of an operating button. The CPU 103 divides the button name region of the operating button held down on the home screen 200 into two regions i.e. a left region and a right region. The CPU 103 determines whether the held-down position is the left region or the right region of the button name region (step S701).

As a result of the determination in the step S701, when the held-down position is the left region of the button name region, the CPU 103 carries out the processes in the step S507 and the subsequent steps without switching the default display position.

Figure 8A:
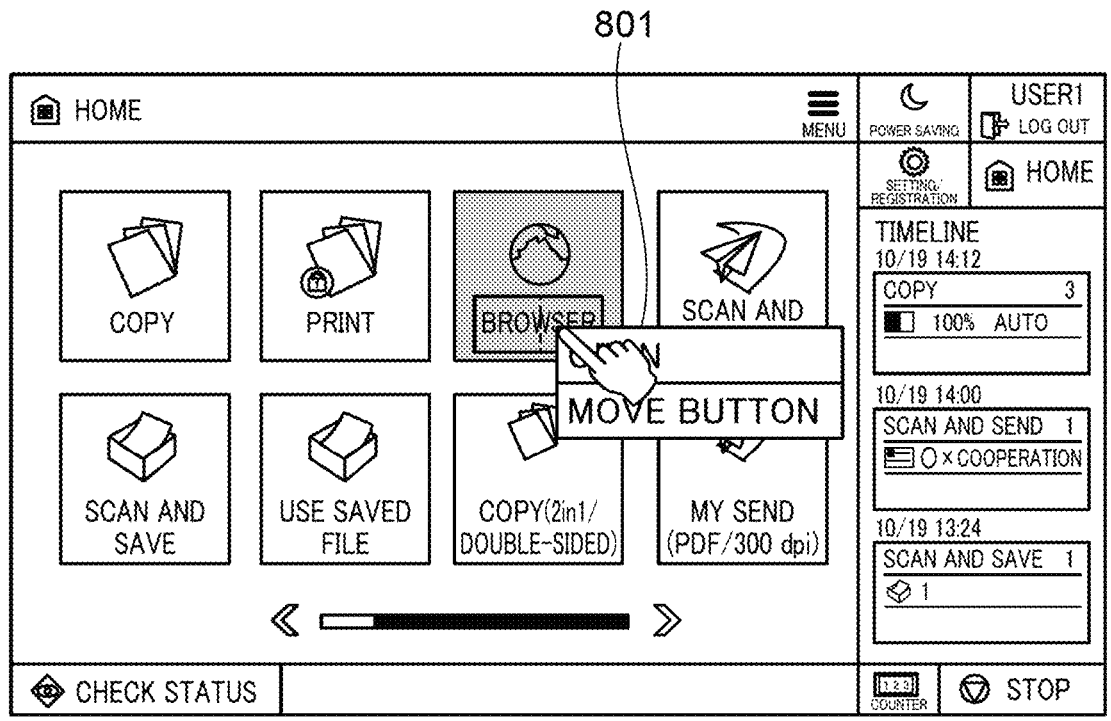
FIGS. 8A and 8B are views showing display examples of a context menu in the display control process in FIG. 7.
Figure 8B:
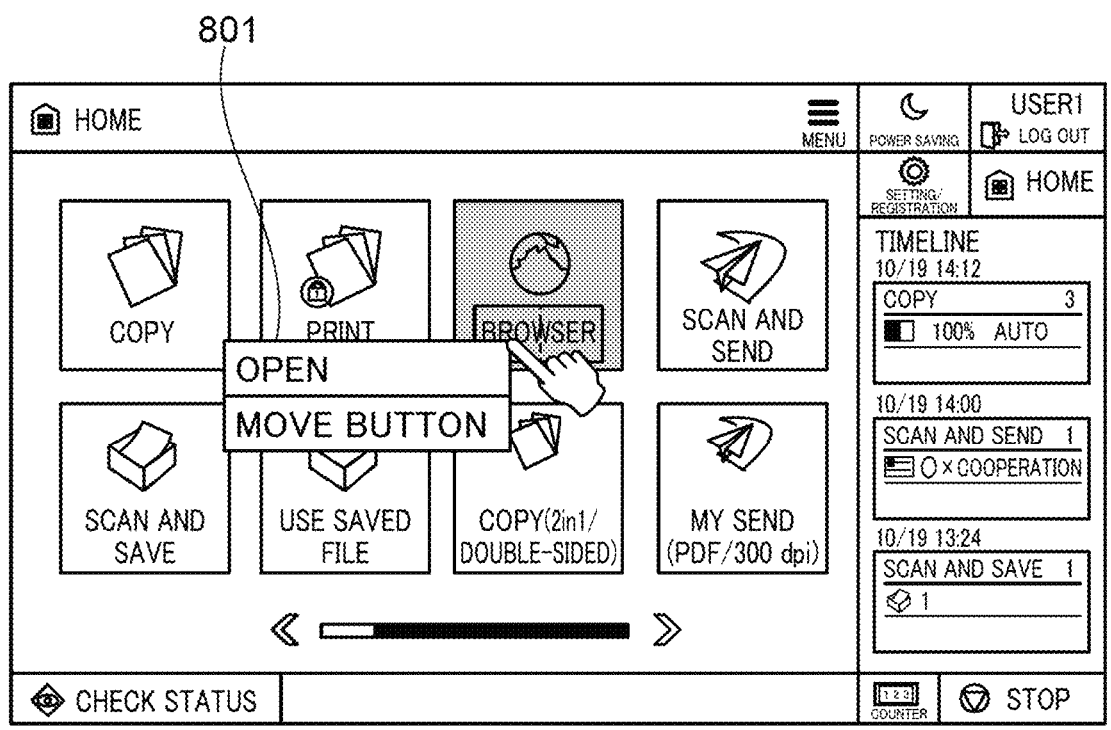

As a result of the determination in the step S701, when the held-down position is the right region of the button name region, the CPU 103 carries out the processes in the step S508 and the subsequent steps. In the step S508, specifically, the CPU 103 switches the default display position to "lower right" such that the left region of the button name region and the context menu do not overlap each other. Namely, in the present embodiment, whichever region of the button name region is held down, a context menu 801 is displayed such that the whole of the button name region in the held-down operating button is not hidden as shown in FIGS. 8A and 8B. After that, the CPU 103 ends the present process.

In the embodiment described above, a characteristic part of a held-down operating button is a button name region of the operating button. Thus, a button name of the held-down operating button is shown to the user when a context menu is displayed.

In the embodiment described above, the default display position of a context menu may be switched based on a held-down position in an icon region (characteristic part region) showing an icon of a held-down operating button.

Figure 9:
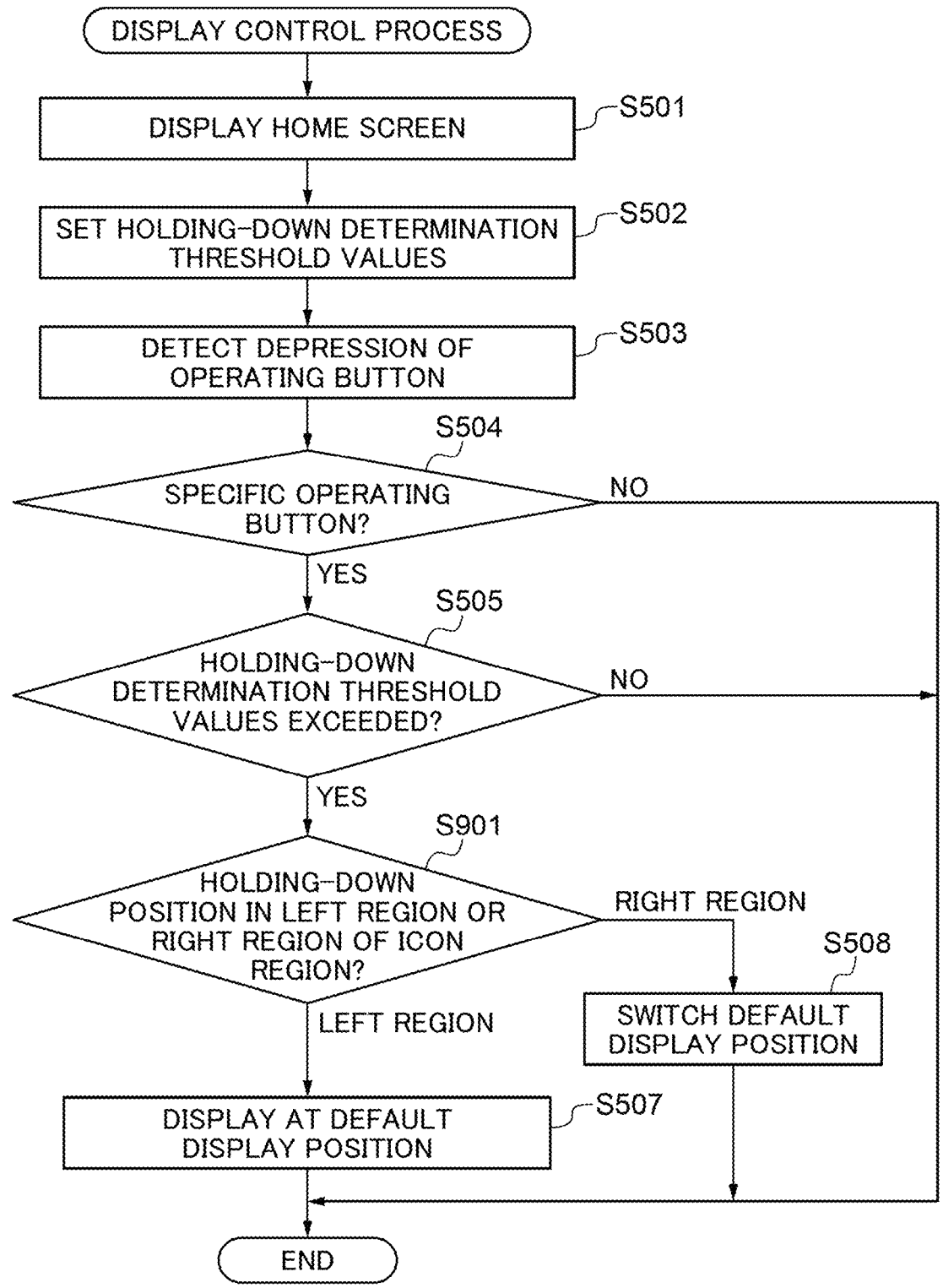
FIG. 9 is a flowchart showing the procedure of a second variation of the display control process in FIG. 5.

FIG. 9 is a flowchart showing the procedure of a second variation of the display control process in FIG. 5. The process in FIG. 9 is also implemented by the CPU 103 executing programs stored in the ROM 105 and the external memory 112. In the process in FIG. 9, it is assumed that the default display position of a context menu is set to, for example, the lower left of a held-down position.

Referring to FIG. 9, the CPU 103 carries out the processes in the steps S501 to S505. Then, the CPU 103 recognizes a held-down position in an icon region of an operating button. The CPU 103 divides the icon region of the operating button held down on the home screen 200 into two regions i.e. a left region and a right region. The CPU 103 determines whether the held-down position is the left region or the right region of the icon region (step S901).

As a result of the determination in the step S901, when the held-down position is the left region of the icon region, the CPU 103 carries out the processes in the step S507 and the subsequent steps without switching the default display position.

Figure 10A:
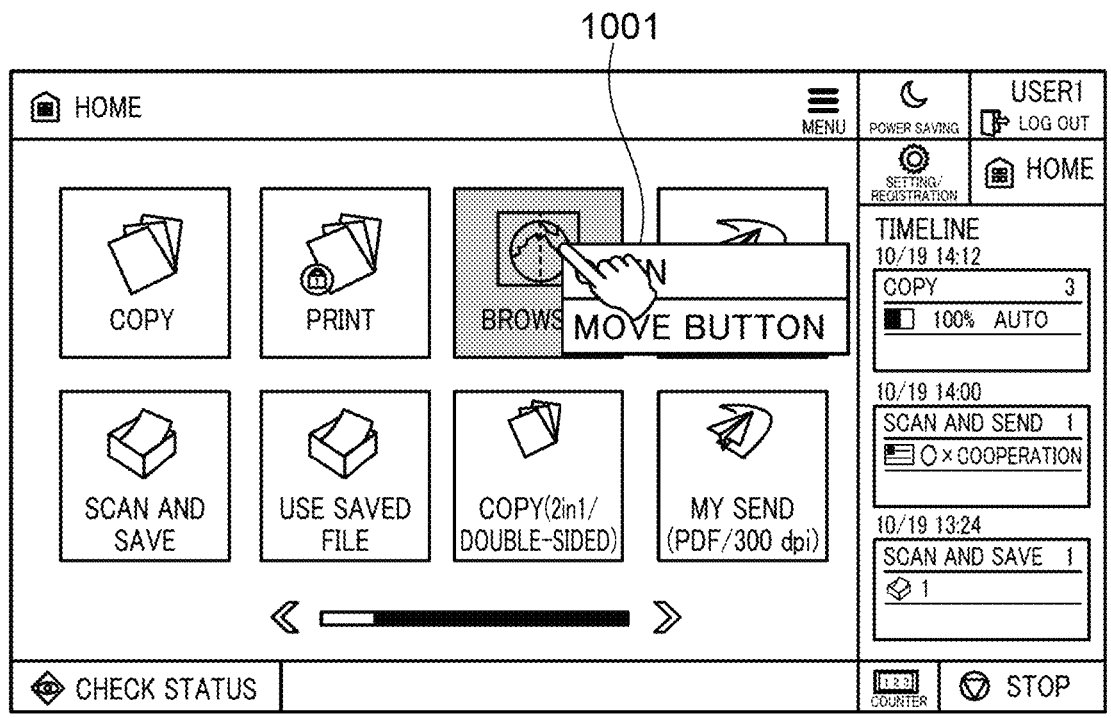
FIGS. 10A and 10B are views showing display examples of a context menu in the display control process in FIG. 9.
Figure 10B:
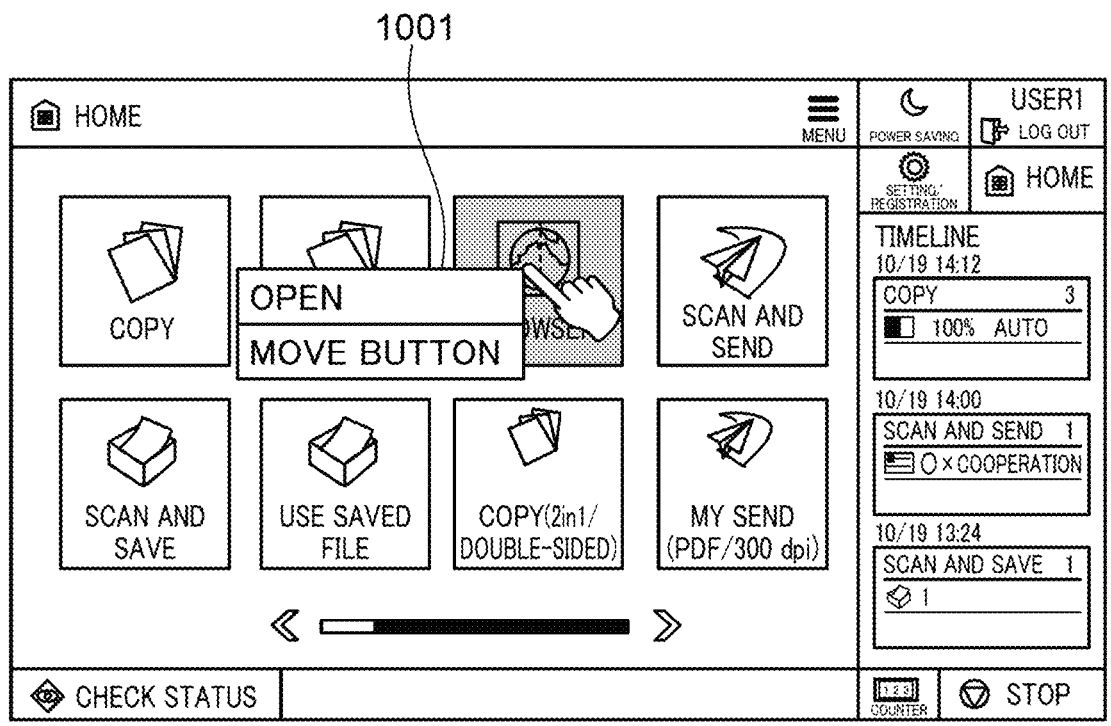

As a result of the determination in the step S901, when the held-down position is the right region of the icon region, the CPU 103 carries out the processes in the step S508 and the subsequent steps. In the step S508, specifically, the CPU 103 switches the default display position to "lower right" such that the left region of the icon region and the context menu do not overlap each other. Namely, in the present embodiment, whichever region of the icon region is held down, a context menu 1001 is displayed such that the whole of the icon region in the held-down operating button is not hidden as shown in FIGS. 10A and 10B. After that, the CPU 103 ends the present process.

In the embodiment described above, a characteristic part of a held-down operating button is an icon region of the operating button. Thus, an icon of the held-down operating button is shown to the user when a context menu is displayed.

Moreover, in the embodiment described above, when holding-down by the user is detected in a right region of a characteristic part such as a button name region or an icon region, the default display position is switched to such a position that the left region of the characteristic part and a context menu do not overlap each other. This prevents the whole of a characteristic part of a held-down operating button from being hidden by a context menu because of a position held down by the user when the context menu is displayed.

In the embodiment described above, the default display position may be switched based on the area of a region where a button region of a held-down operating button and a context menu overlap each other.

Figure 11A:
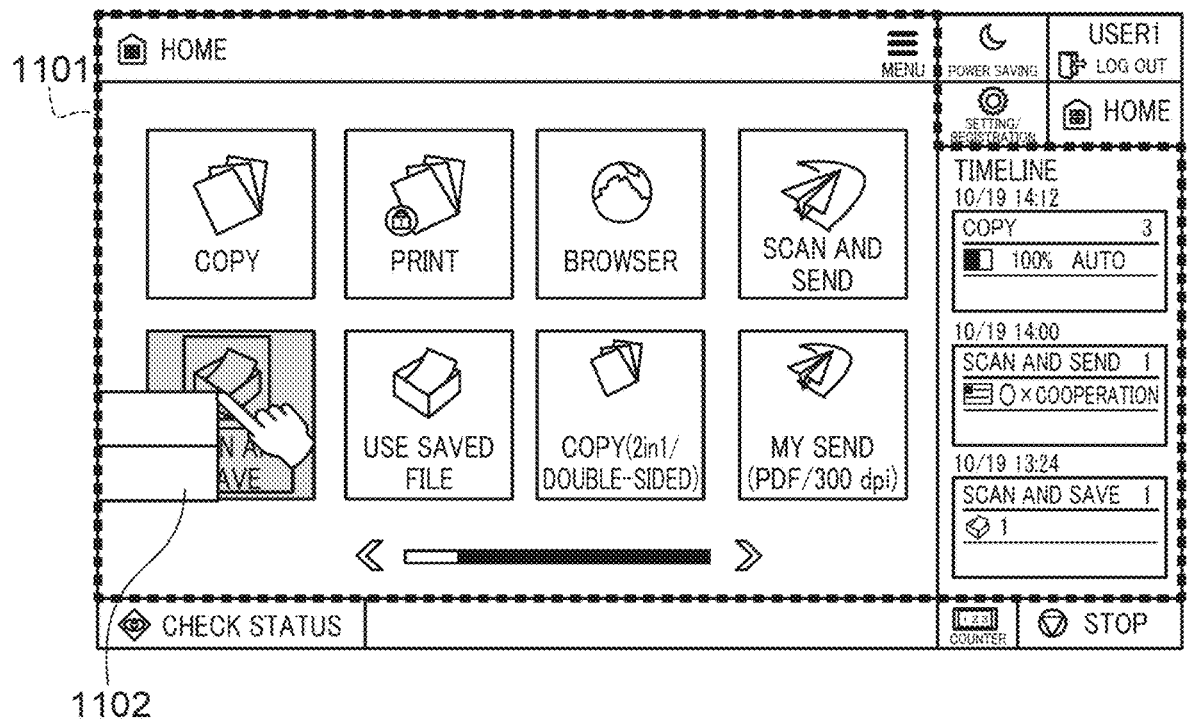
FIGS. 11A and 11B are views showing display examples of a context menu in cases where the context menu does not fit in a displayable area on the home screen in FIG. 2.
Figure 11B:
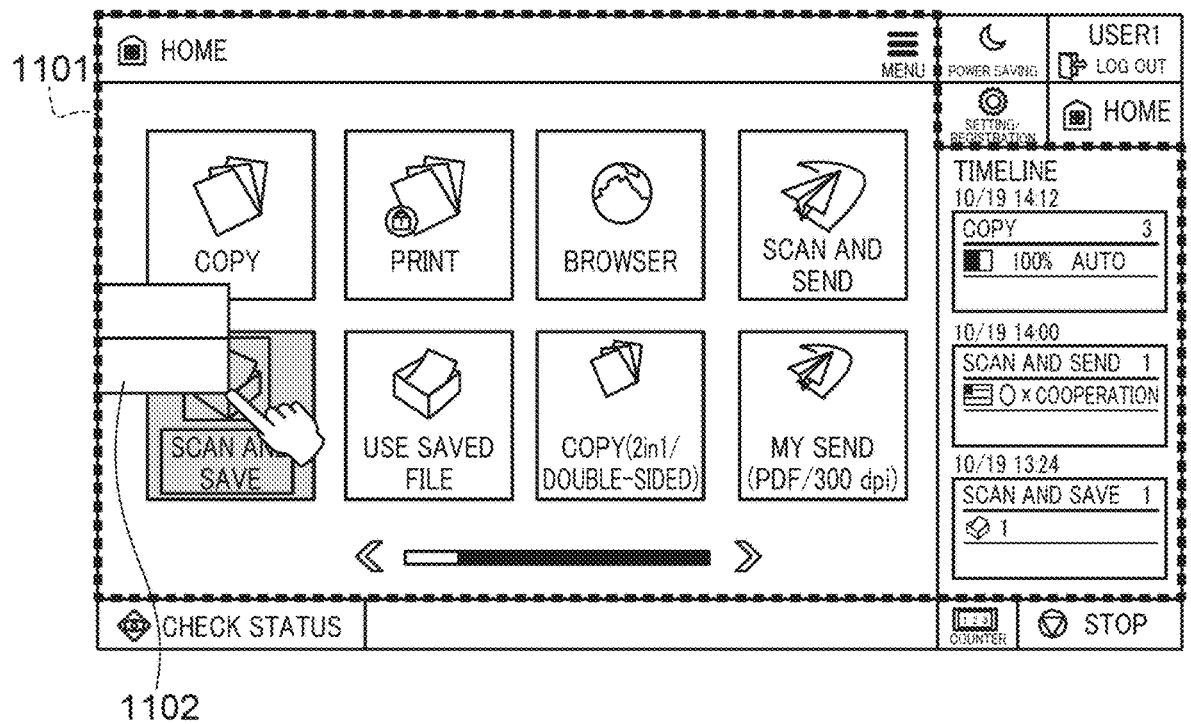

Here, for example, when the user does not hold down an appropriate position on an operating button, a context menu 1102 does not fit into a displayable region 1101 of the home screen 200 in some cases as shown in FIGS. 11A and 11B. When the context menu 1102 does not fit into the displayable region 1101, the user cannot use the context menu 1102.

To cope with this, in the present embodiment, when the context menu 1102 does not fit into the displayable region 1101, the default display position is switched to a position selected from a plurality of candidates i.e. lower left, upper left, lower right, and upper right, and more specifically, a position at which the context menu 1102 fits into the displayable region 1101 and the degree to which a characteristic part of a held-down operating button and a context menu region overlap each other is the lowest.

Figure 12:
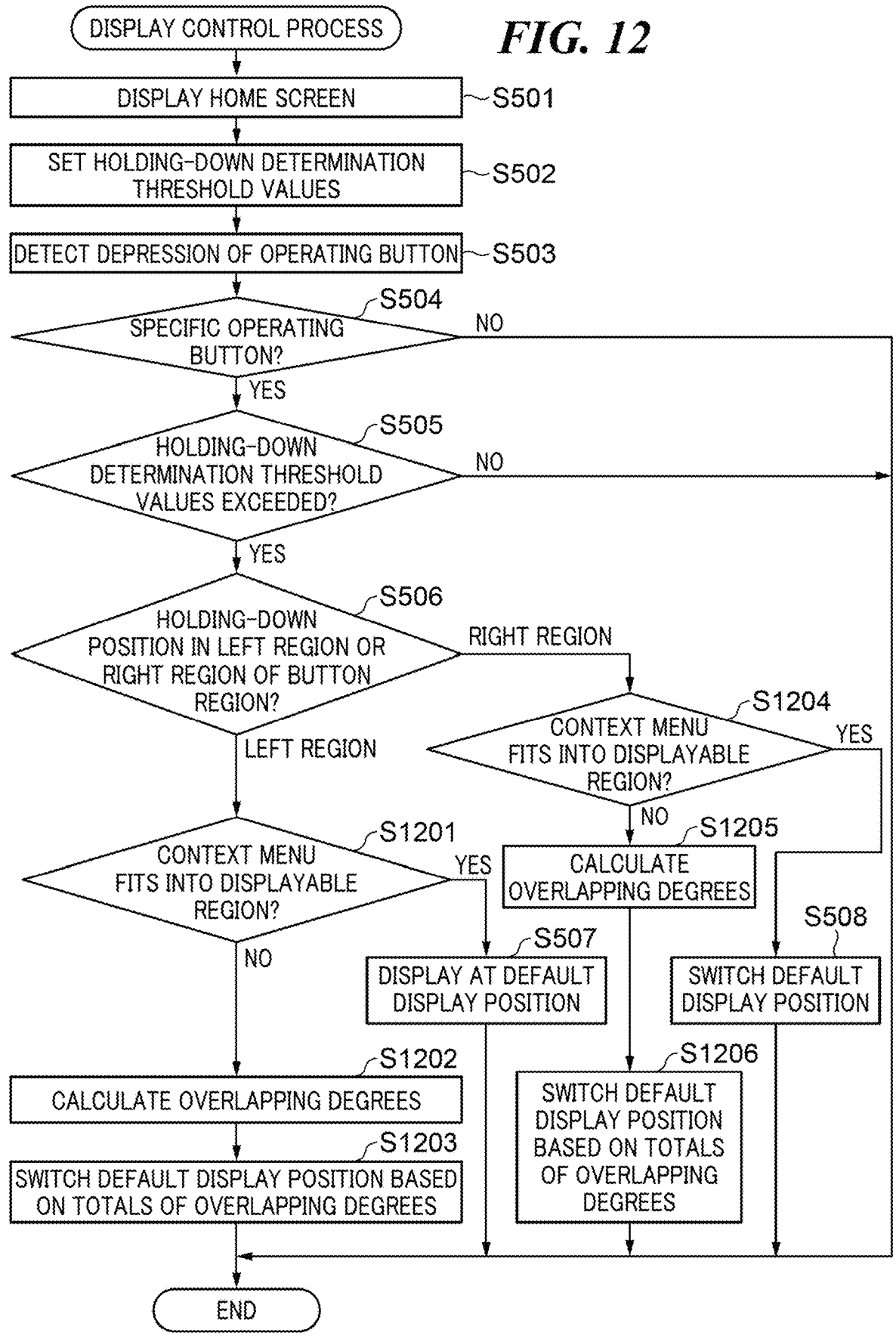
FIG. 12 is a flowchart showing the procedure of a third variation of the display control process in FIG. 5.

FIG. 12 is a flowchart showing the procedure of a third variation of the display control process in FIG. 5. The process in FIG. 12 is also implemented by the CPU 103 executing programs stored in the ROM 105 and the external memory 112. In the process in FIG. 12, it is assumed that the default display position of a context menu is set to, for example, the "lower left".

Referring to FIG. 12, the CPU 103 carries out the processes in the steps S501 to S506.

As a result of the determination in the step S506, when the held-down position is the left region of the button region, the CPU 103 determines whether or not a context menu fits into the displayable region 1101 when the context menu is displayed at the default display position (step S1201). In the step S1201, when all the corner coordinates of the context menu displayed at the default display position lie inside the displayable region 1101, the CPU 103 determines that the context menu fits into the displayable region 1101. On the other hand, in the step S1201, when any of the corner coordinates of the context menu displayed at the default display position does not lie inside the displayable region 1101, the CPU 103 determines that the context menu does not fit into the displayable region 1101.

Figure 13A:
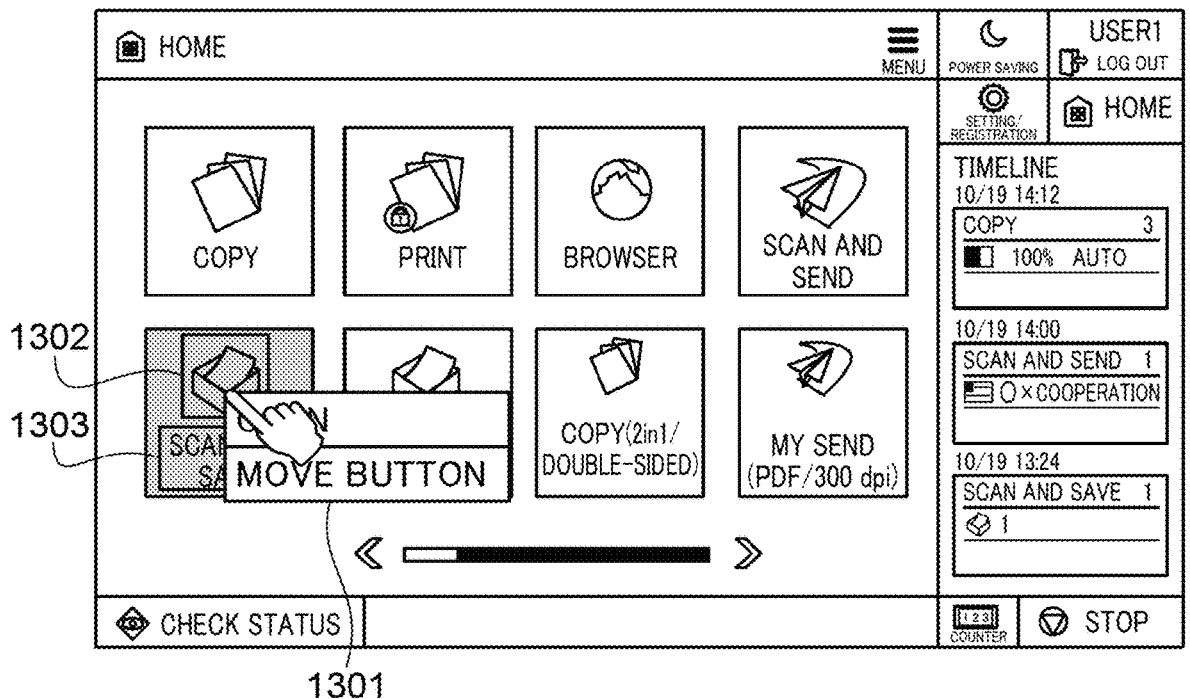
FIGS. 13A and 13B are views showing display examples of a context menu in the display control process in FIG. 12.
Figure 13B:
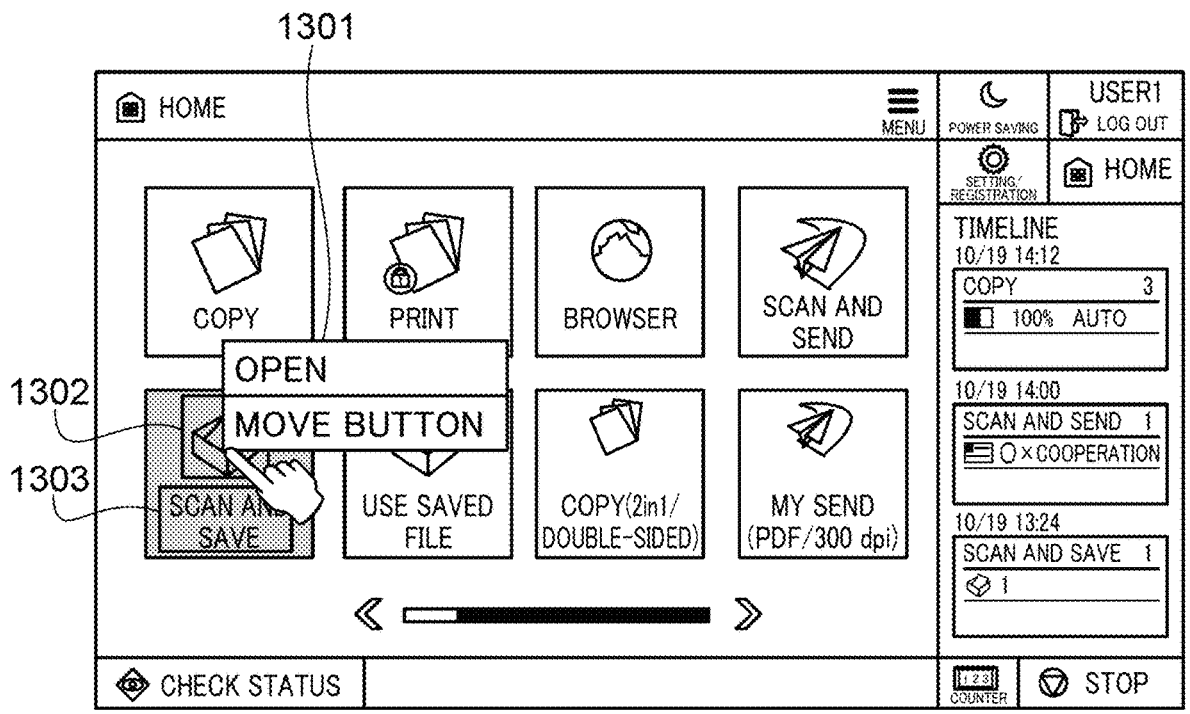

As a result of the determination in the step S1201, when the context menu fits into the displayable region 1101, the CPU 103 carries out the processes in the step S507 and the subsequent steps. As a result of the determination in the step S1201, when the context menu does not fit into the displayable region 1101, the CPU 103 identifies positions at which the context menu fits into the displayable region 1101 from a plurality of candidates i.e. lower left, upper left, lower right, and upper right, and more specifically, lower right and upper right. Then, the CPU 103 calculates the degrees of overlapping to which the context menu and characteristics parts of a held-down operating button overlap each other when the context menu is displayed at each of the identified positions (step S1202). The degrees of overlapping are values representing percentages by which the respective characteristic parts i.e. a button name region and an icon region of the operating button and the context menu overlap each other. In the step S1202, the CPU 103 calculates the degree of overlapping for each of the characteristic parts when the context menu is displayed at each of the identified positions. For example, in a case where a context menu 1301 is displayed on the lower right of the held-down position as shown in FIG. 13A, the CPU 103 calculates the degree of overlapping of an icon region 1302 at 15% and the degree of overlapping of a button name region 1303 at 50%. In a case where the context menu 1301 is displayed on the upper right of the held-down position as shown in FIG. 13B, the CPU 103 calculates the degree of overlapping of the icon region 1302 at 15% and the degree of overlapping of the button name region 1303 at 0%.

Then, for each of the identified positions, the CPU 103 calculates a total of the calculated degrees of overlapping of the characteristic parts. After that, the CPU 103 switches the default display position based on the calculated totals of the degrees of overlapping (step S1203). Specifically, the CPU 103 switches the default display position to "upper right" at which the calculated total is smaller than that for the other identified position. In the step S1203, when the totals for the respective identified positions are the same, the CPU 103 determines the default display position according to priorities set in advance. It should be noted that in the present embodiment, a weighting coefficient may be set for each characteristic part, and the default display position may be switched based on the weighting coefficient and the degree of overlapping of each characteristic part. After that, the CPU 103 ends the present process.

As a result of the determination in the step S506, when the held-down position is in the right region of the button region, the CPU 103 determines whether or not the context menu fits into the displayable region 1101 when the context menu is displayed at the default display position (step S1204).

As a result of the determination in the step S1204, when the context menu fits into the displayable region 1101, the CPU 103 carries out the processes in the step S508 and the subsequent steps. As a result of the determination in the step S1204, when the context menu does not fit into the displayable region 1101, the CPU 103 identifies positions at which the context menu fits into the displayable region 1101. Then, as with the step S1202, the CPU 103 calculates the degrees of overlapping to which the respective characteristic parts of the held-down operating button and the context menu overlap each other when the context menu is displayed at each of the identified positions (step S1205). After that, the CPU 103 totals the degrees of overlapping of the characteristic parts calculated for each identified position. As with the step S1203, the CPU 103 then switches the default display position based on the calculated totals of the degrees of overlapping (step S1206) and ends the present process.

In the embodiment described above, when a context menu does not fit into the displayable region 1101, the default display position is switched to a display position at which the context menu fits into the displayable region 1101 and the degree to which characteristic parts and the context menu region overlap each other is the lowest. This prevents the context menu from becoming unavailable to the user dependently on a position held down by the user on an operating button.

In the embodiment described above, when a context menu does not fit into the displayable region 1101, the default display position may be switched to a position at which the context menu fits into the displayable region 1101 and which borders on a held-down operating button.

Figure 14B:
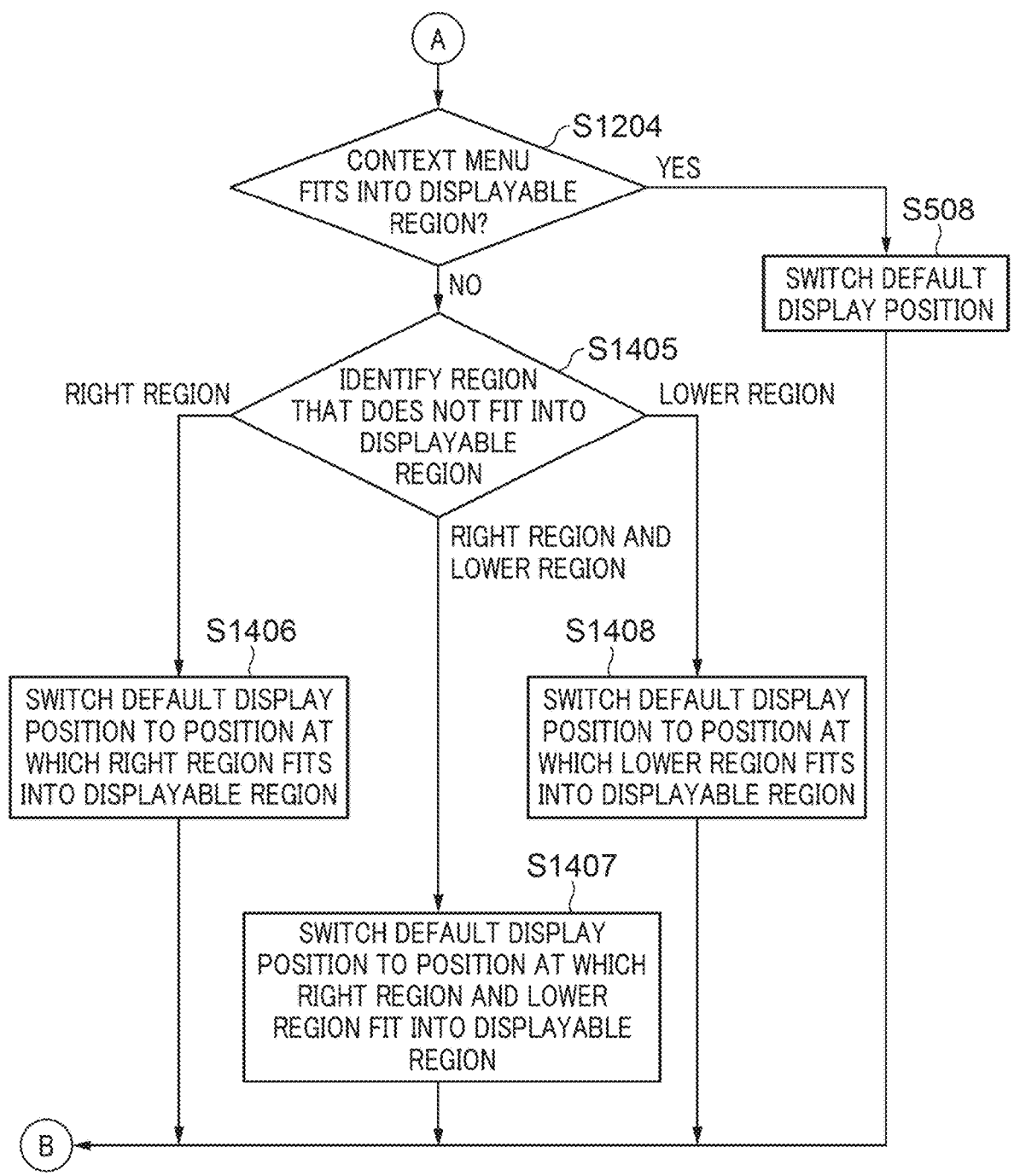

FIGS. 14A and 14B are flowcharts showing the procedure of a fourth variation of the display control process in FIG. 5. The process in FIGS. 14A and 14B is also implemented by the CPU 103 executing programs stored in the ROM 105 and the external memory 112. In the process in FIGS. 14A and 14B, it is also assumed that a default display position of a context menu is set to, for example, "lower left".

Referring to FIGS. 14A and 14B, the CPU 103 carries out the processes in the steps S501 to S506.

As a result of the determination in the step S506, when the held-down position is the left region of the button region, the CPU 103 carries out the process in the step S1201.

As a result of the determination in the step S1201, when the context menu fits into the displayable region 1101, the CPU 103 carries out the processes in the step S507 and the subsequent steps. As a result of the determination in the step S1201, when the context menu does not fit into the displayable region 1101, the CPU 103 identifies a region of the context menu which does not fit into the displayable region 1101 (step S1401). When the default display position is "lower left", the region of the context menu which does not fit into the displayable region 1101 is likely to be a left region of the context menu, a lower region of the context menu, or both the left region and the lower region of the context menu.

Figure 15:
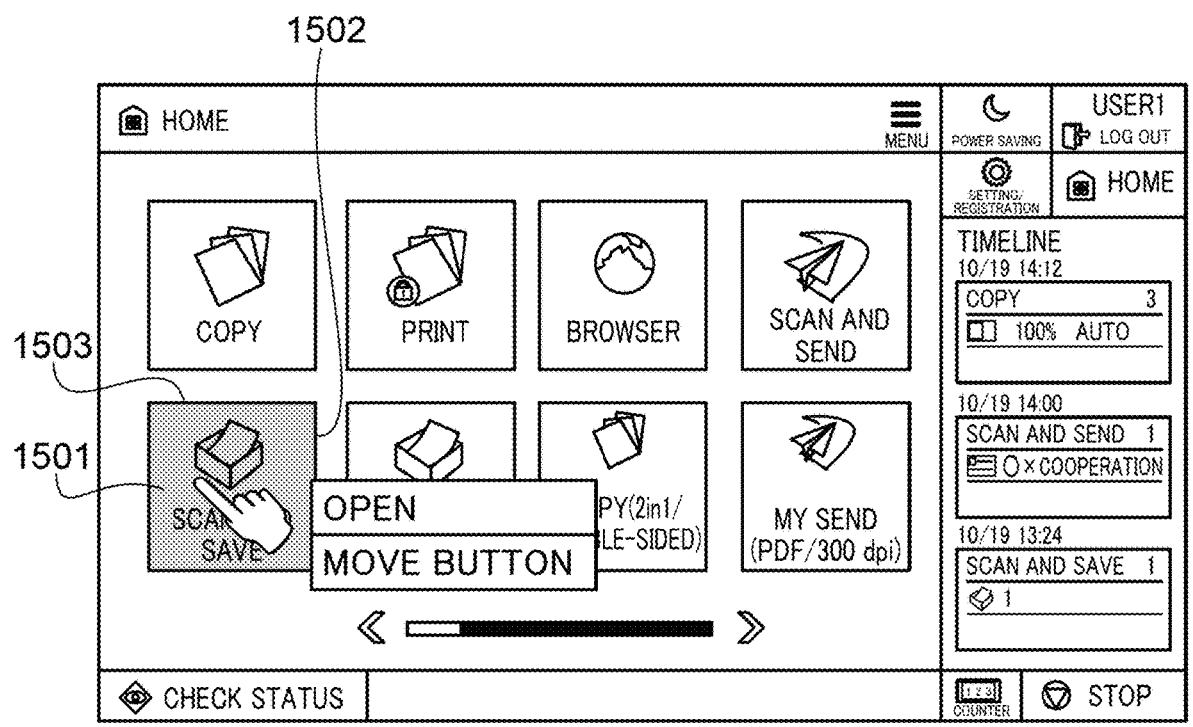
FIG. 15 is a view showing a display example of a context menu displayed in the display control process in FIGS. 14A and 14B.

In the step S1401, when the region of the context menu which does not fit into the displayable region 1101 is the left region of the context menu, the CPU 103 switches the default display position to a position at which the left region of the context menu fits into the displayable region 1101 (step S1402). Specifically, the CPU 103 switches the default display position to a position at which the context menu does not overlap the held-down operating button and the context menu borders on a right border line 1502 forming a button region 1501 of the operating button in FIG. 15. After that, the CPU 103 ends the present process.

In the step S1401, when the region of the context menu which does not fit into the displayable region 1101 is both the left region and the lower region of the context menu, the CPU 103 switches the default display position to a position at which both the left region and the right region of the context menu fit into the displayable region 1101 (step S1403). Specifically, the CPU 103 switches the default display position to an upper position at which the context menu does not overlap the held-down operating button and the context menu borders on the right border line 1502. After that, the CPU 103 ends the present process.

In the step S1401, when the region of the context menu which does not fit into the displayable region 1101 is the lower region of the context menu, the CPU 103 switches the default display position to a position at which the lower region of the context menu fits into the displayable region 1101 (step S1404). Specifically, the CPU 103 switches the default display position to a position at which the context menu does not overlap the held-down operating button and the context menu borders on an upper border line 1503 forming a button region of the operating button. After that, the CPU 103 ends the present process.

As a result of the determination in the step S506, when the held-down position is the right region of the button region, the CPU 103 switches the default display position to, for example, "lower right". The CPU 103 then carries out the process in the step S1204.

As a result of the determination in the step S1204, when the context menu fits into the displayable region 1101, the CPU 103 carries out the processes in the step S508 and the subsequent steps. As a result of the determination in the step S1204, when the context menu does not fit into the displayable region 1101, the CPU 103 identifies a region of the context menu which does not fit into the displayable region 1101 (step S1405). When the default display position is "lower right", the region of the context menu which does not fit into the displayable region 1101 is likely to be the right region of the context menu, the lower region of the context menu, or both the right region and the lower region of the context menu.

In the step S1405, when the region of the context menu which does not fit into the displayable region 1101 is the right region of the context menu, the CPU 103 switches the default display position to a position at which the right region of the context menu fits into the displayable region 1101 (step S1406). Specifically, the CPU 103 switches the default display position to a position at which the context menu does not overlap the held-down operating button and the context menu borders on a left border line (not shown) forming the button region of the operating button. After that, the CPU 103 ends the present process.

In the step S1405, when the region of the context menu which does not fit into the displayable region 1101 is both the right region and the lower region of the context menu, the CPU 103 switches the default display position to a position at which both the right region and the lower region of the context menu fit into the displayable region 1101 (step S1407). Specifically, the CPU 103 switches the default display position to an upper position at which the context menu does not overlap the held-down operating button and the context menu borders on the left border line of the button region of the operating button. After that, the CPU 103 ends the present process.

In the step S1405, when the region of the context menu which does not fit into the displayable region 1101 is the lower region of the context menu, the CPU 103 switches the default display position to a position at which the lower region of the context menu fits into the displayable region 1101 (step S1408). Specifically, the CPU 103 switches the default display position to a position at which the context menu does not overlap the held-down operating button and the context menu borders on an upper border line (not shown) forming the button region of the operating button. After that, the CPU 103 ends the present process.

According to the embodiment described above, when a context menu does not fit into a displayable region, the default display position is switched to a display position at which the context menu fits into the displayable region and the context menu is in contact with a held-down operating button without overlapping the operating button. This makes it easy to see characteristic parts of the held-down operating button while ensuring the relation between the held-down operating button and the displayed context menu.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-021132, filed Feb. 8, 2018, which is hereby incorporated by reference herein in its entirety.

What is claimed is:

1. An information processing apparatus that has a display unit and displays an instruction setting menu for giving an instruction to execute a function corresponding to an operating object displayed on the display unit when a predetermined operation on the operating object by a user is detected, comprising:
   at least a processor and at least a memory coupled to the at least the processor and having stored thereon instructions, which when executed by the at least the processor, act as:
   a display control unit configured to perform a control to display the instruction setting menu at a right side of a touch position in a case where the touch position is in a right region of the operating object and where the instruction setting menu can be displayed at the right side of the touch position, and to display the instruction setting menu at a left side of the touch position in a case where the touch position is in a left region of the operating object and where the instruction setting menu can be displayed at the left side of the touch position,
   wherein at least one of a character string and an image displayed on the operating object is still displayed in a recognizable state even when the instruction setting menu is displayed on the display unit.

2. The information processing apparatus according to claim 1, wherein a characteristic part region representing a characteristic part that represents the function corresponding to the operating object on the display unit is divided into the right region and the left region, and
   when the touch position is detected in one of the right and left regions of the characteristic part region, the display control unit controls to display the instruction setting menu at a position at which the other of the right and left regions of the characteristic part region and the instruction setting menu do not overlap each other.

3. The information processing apparatus according to claim 2, wherein the characteristic part is a name of the operating object.

4. The information processing apparatus according to claim 2, wherein the characteristic part is an icon that represents a function of the operating object.

5. The information processing apparatus according to claim 2, wherein in a case where all items displayed on the instruction setting menu do not fit into a displayable region of the display unit, the display control unit performs a control to display the instruction setting menu at a position selected from among a plurality of candidates, the selected position being a position at which all the items displayed on the instruction setting menu fit into the displayable region and at which a degree to which the instruction setting menu and the characteristic part overlap each other is lowest.

6. The information processing apparatus according to claim 2, wherein in a case where all items displayed on the instruction setting menu do not fit into a displayable region of the display unit, the display control unit performs a control to display the instruction setting menu at a position at which all the items displayed on the instruction setting menu fit in the displayable region and at which the instruction setting menu borders on the operating object corresponding to the touch position without overlapping the operating object.

7. The information processing apparatus according to claim 1, wherein the predetermined operation on the operating object is a holding-down operation.

8. The information processing apparatus according to claim 1, wherein the instruction setting menu is a context menu that includes a list of operations for the function corresponding to the operating object.

9. The information processing apparatus according to claim 8, wherein the instruction setting menu includes one of an item for changing a name of the operating object, an item for deleting the operating object, and an item for moving the operating object.

10. The information processing apparatus according to claim 1, wherein the operating object is an operating button for calling the function.

11. The information processing apparatus according to claim 1, wherein an area of the operating object is larger than an area of the right region or the left region touched by the user.

12. The information processing apparatus according to claim 1, wherein a state in which the instruction setting menu can be displayed is a state in which coordinates in a vertex direction of the instruction setting menu exist in a displayable area of the display unit.

13. A control method for an information processing apparatus that has a display unit and displays an instruction setting menu for giving an instruction to execute a function corresponding to an operating object displayed on the display unit when a predetermined operation on the operating object by a user is detected, the control method comprising:
   performing a control to display the instruction setting menu at a right side of a touch position in a case where the touch position is in a right region of the operating object and where the instruction setting menu can be displayed at the right side of the touch position, and to display the instruction setting menu at a left side of the touch position in a case where the touch position is in a left region of the operating object and where the instruction setting menu can be displayed at the left side of the touch position,
   wherein at least one of a character string and an image displayed on the operating object is still displayed in a recognizable state even when the instruction setting menu is displayed on the display unit.

14. A non-transitory computer-readable storage medium storing a program for causing a computer to execute a control method for an information processing apparatus that has a display unit and displays an instruction setting menu for giving an instruction to execute a function corresponding to an operating object displayed on the display unit when a predetermined operation on the operating object by a user is detected, the control method comprising:
   performing a control to display the instruction setting menu at a right side of a touch position in a case where the touch position is in a right region of the operating object and where the instruction setting menu can be displayed at the right side of the touch position, and to display the instruction setting menu at a left side of the touch position in a case where the touch position is in a left region of the operating object and where the instruction setting menu can be displayed at the left side of the touch position,
   wherein at least one of a character string and an image displayed on the operating object is still displayed in a recognizable state even when the instruction setting menu is displayed on the display unit.

* * * * *